UNITED STATES PATENT OFFICE.

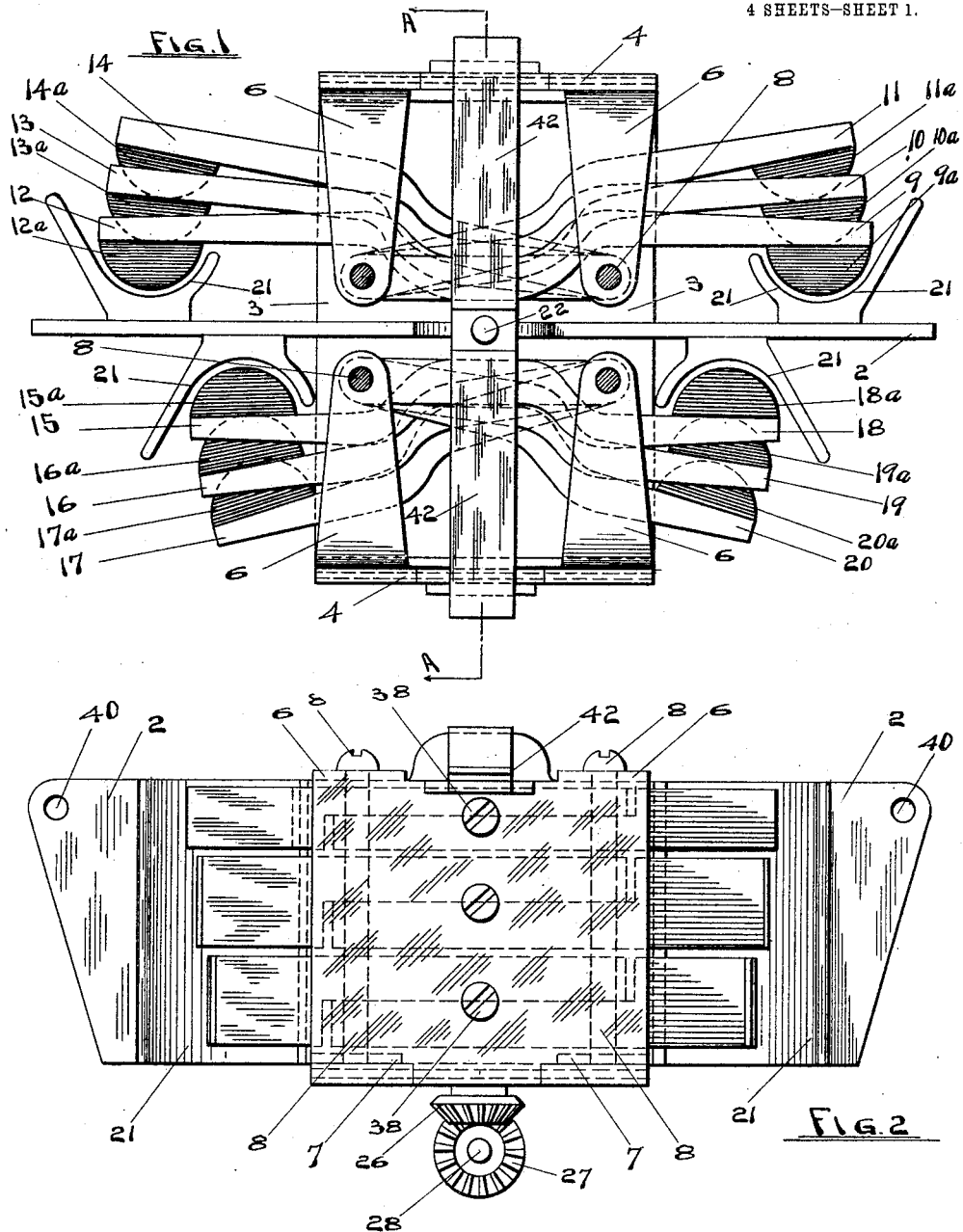

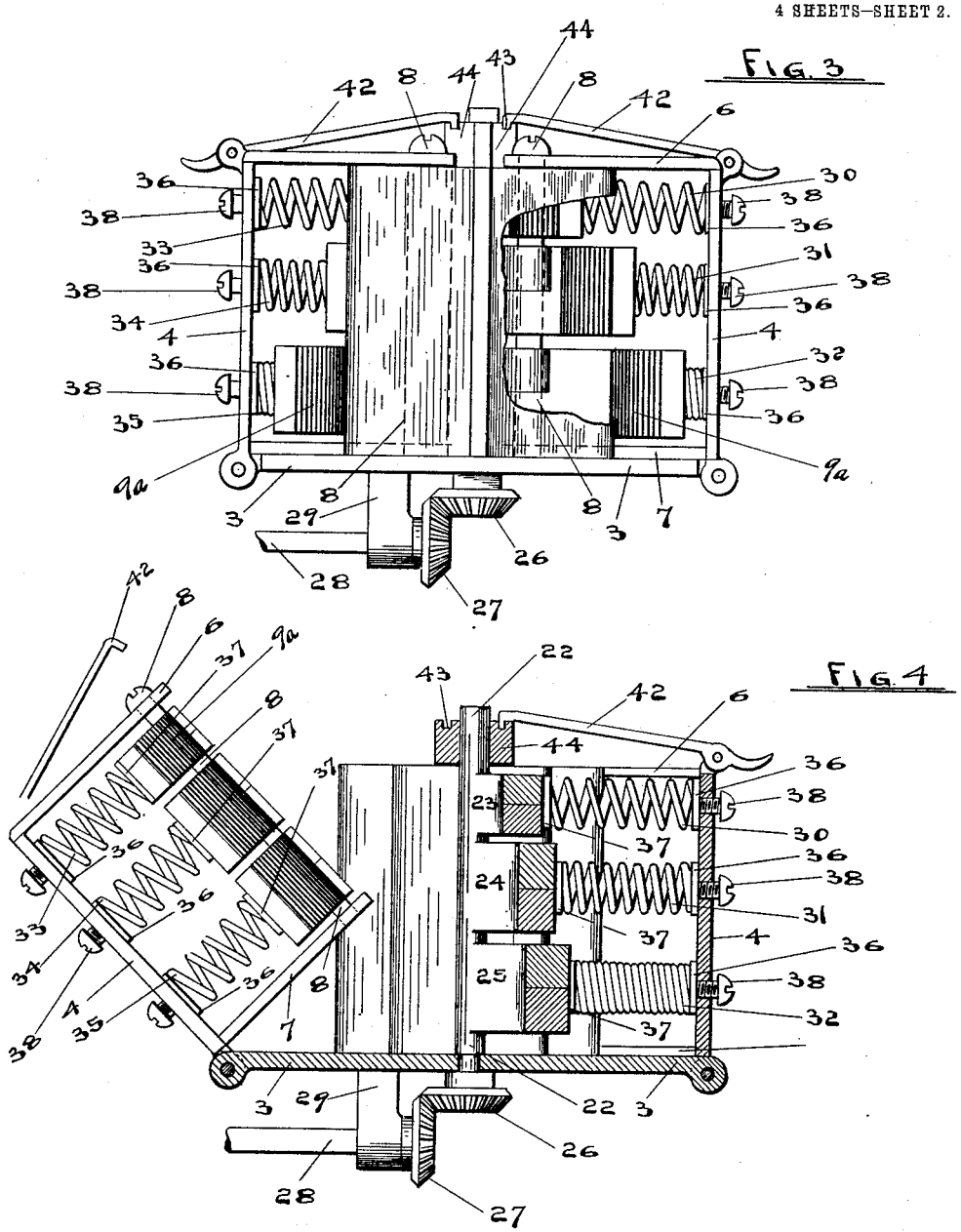

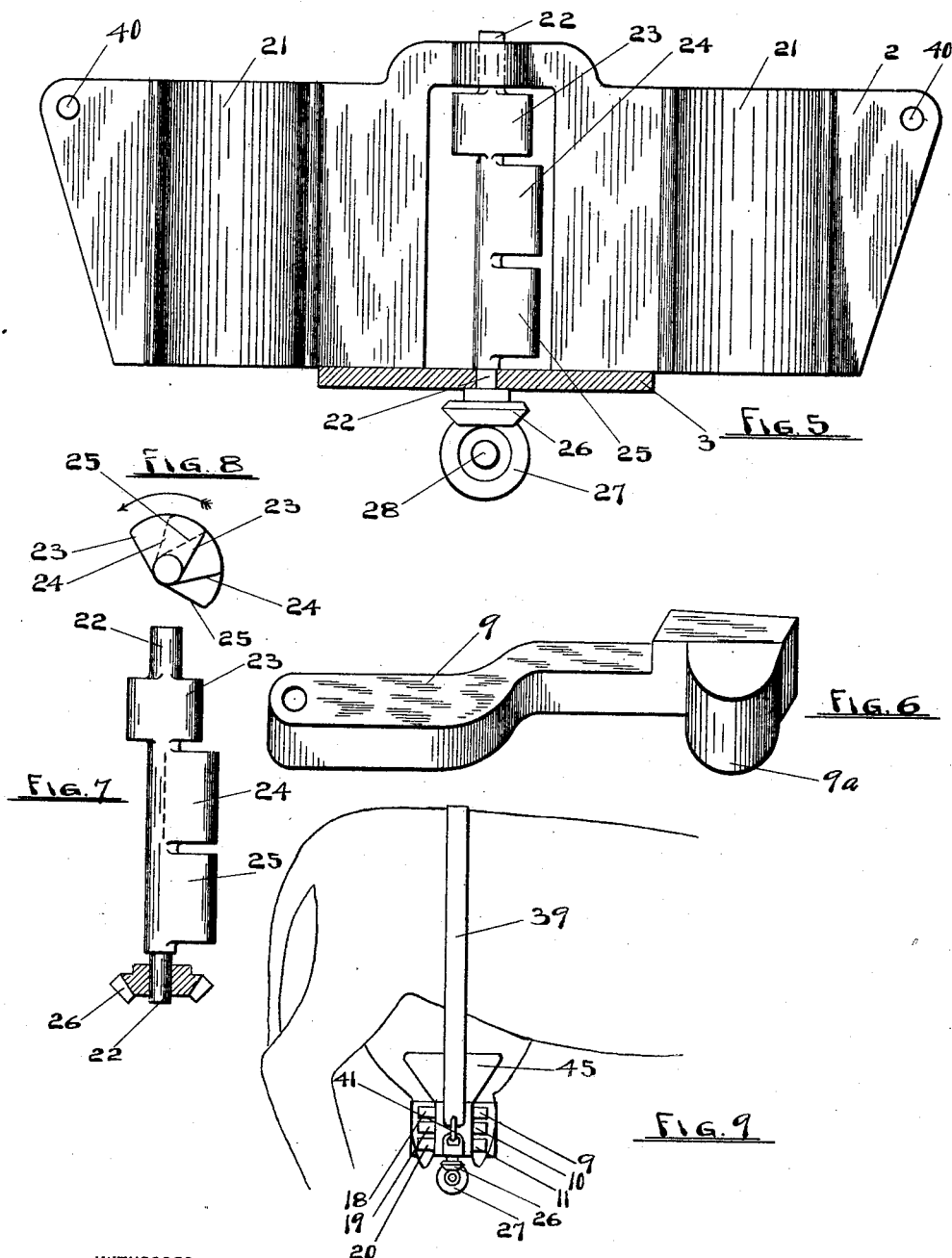

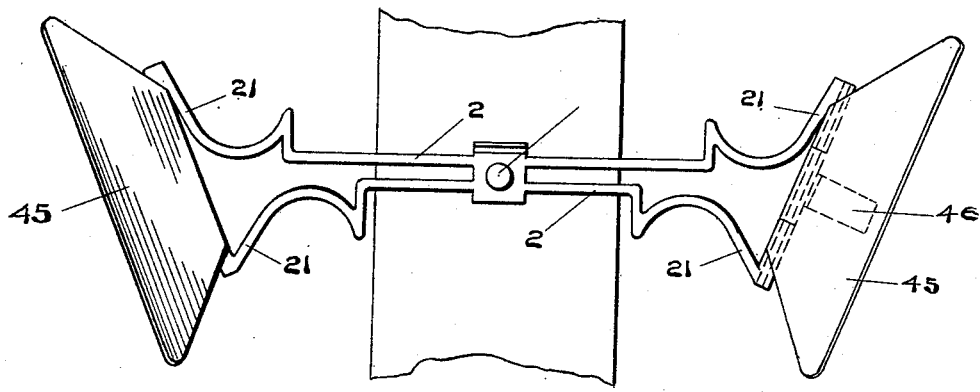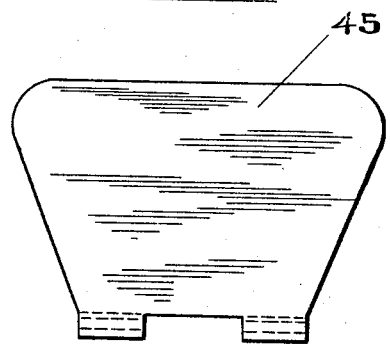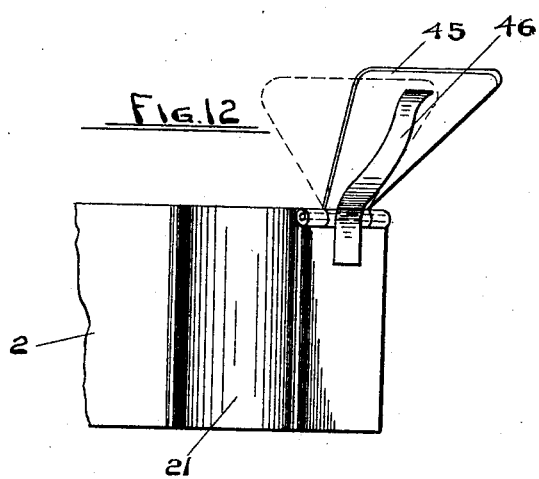

GEORGE A. BRODIE, OF PORTLAND, OREGON.

COW-MILKING APPARATUS.

1,113,170. Specification of Letters Patent. Patented Oct. 6, 1914.

Application filed December 20, 1913. Serial No. 807,802.

*To all whom it may concern:*

Be it known that I, GEORGE A. BRODIE, a citizen of the United States, residing at Portland, in the county of Multnomah and State of Oregon, have invented certain new and useful Improvements in Cow-Milking Apparatus, of which the following is a specification.

My invention relates to devices that are adapted to be attached to the body of a cow, and whereby milk is drawn from the cow by means of cam-actuated, reciprocating fingers, operated by any form of power; the said action being efficient and positive without being injurious to the cow.

The object of my invention is to provide a device of this kind that is simple in construction, durable, inexpensive in manufacture;—and to further provide a device that may be conveniently transported, and easily and quickly attached in place when so desired for milking purposes.

Another object of my invention is the sanitary feature which provides that the milk passes immediately from the teats into a pail or other receptacle which may be hung to the machine, or placed in close proximity to the said teats.

With the above and other useful objects in view, my invention consists of certain novel features of construction, combinations of elements, and arrangements of parts hereinafter fully set forth and particularly pointed out in the appended claims.

In order to more clearly comprehend my invention, reference must be had to the accompanying drawings which form part of this application, in which:—

Figure 1 is a top plan view of my invention; Fig. 2 is a side elevation of same; Fig. 3 is an end elevation of same, with part of one seat broken away to show the figures; Fig. 4 is a section and end elevation of same; the section being taken on line A A, Fig. 1; Fig. 5 is a side elevation of my invention with the fingers removed; Fig. 6 is a perspective of one of the fingers; Fig. 7 is a side elevation of the cams; Fig. 8 is a plan view of same; Fig. 9 is a detail showing the complete device attached to the body of a cow; Fig. 10 is a top plan view similar to Fig. 1, showing pressure-pads attached to the center-plate; Fig. 11 is an end elevation of the pressure-pads, and Fig. 12 is a side elevation of Fig. 10, partly broken away.

Like characters of reference indicate like parts in the several views of the drawings, of which the numeral 2 indicates a center-plate to which is fastened a bottom-plate 3, with side-plate 4 hinged thereto; said side-plates having arms 6—7 extending therefrom and to which are attached screws 8, which serve as bearings for fingers 9—10—11—12—13—14—15—16—17—18—19—20 respectively.

By observing Fig. 6, it will be noted that the fingers are so constructed that each one overlaps the corresponding one at the other side of the device, *i. e.*, finger 9 overlaps finger 12; finger 10 overlaps finger 13, *et sic de ceteris*. Attached adjacent the ends of said fingers are tips $9^a$—$10^a$—$11^a$—$12^a$—$13^a$—$14^a$—$15^a$—$16^a$—$17^a$—$18^a$—$19^a$—$20^a$ respectively, which register with the teats and press them into seats 21 when said fingers are actuated by the cams as will be hereinafter explained; said tips being made of rubber, leather, or other tenacious material and attached by any convenient means to the fingers which are preferably made of metal.

Revolubly attached to center-plate 2 and bottom-plate 3 is a cam-shaft 22 with cams 23—24—25 fixed thereto; said cams being operated by bevel-gear 26 which is fixed to cam-shaft 22 and driven by pinion 27; said pinion being fastened to shaft 28 which is revolubly mounted in hanger 29; said hanger being attached to bottom-plate 3, as shown in Figs. 3 and 4.

Passing from side-plates 4 to the fingers are helical springs 30—31—32—33—34—35, which serve to press said fingers toward seats 21 as the cams leave said fingers in their rotary travel. Fixed to the ends of said springs intermediate the side-plates and fingers are washers 36 and 37; said washers 36 rest against set-screws 38 which regulate the tension of the springs, while washers 37 serve to keep said springs astride of the overlapping portions of the fingers.

In Fig. 10 it will be seen that the center-plate 2 has transversely hinged thereto, pressure-pads 45 which press against the udder of the cow and serve to force the milk downwardly into the teats; said pressure-pads are held close to the udder by means of leaf-springs 46, which force said pressure-pads against said udder as it gradually diminishes in volume during the process of milking.

A salient feature of my invention is the arrangement of cams, which are so located on the cam-shaft that the highest point of the top cam, (i. e., the point that opens the fingers with which it comes in contact, to their extreme distance), is exactly ninety degrees past the highest point of the bottom cam; while the highest points of the intermediate cams are divided into the component parts of ninety degrees. The illustrations show three cams, but any number may be used, provided that all of the other elements with which the cams coöperate are also added to the structure. When only three cams are used, the highest points thereof are forty-five degrees apart, while the highest points would be 22½ degrees apart if four cams were used, and so of any of the component parts of ninety degrees.

In order to operate my invention the complete apparatus is fastened to the body of a cow by means of a strap 39, which is attached to apertures 40 in center-plate 2, by means of links 41, which are fastened to said strap; when said strap is drawn tight, the pressure-pads 45 engage the sides of the udder and are constantly held in contact therewith by means of leaf-springs 46;— the hinged portions are then opened as shown on the left side of Fig. 4 in order that the teats of the cow may be placed in seats 21, after which said hinged portions are brought back to normal as shown in Fig. 3, and locked in such position by means of latches 42 which engage slots 43 in boss 44. The next operation is to rotate shaft 28, which turns pinion 27; said pinion intermeshes with gear 26 and rotates the cams which operate in the following order:—Cam 23 simultaneously opens fingers 9 and 12, and as said cam leaves said fingers, spring 30 presses against them and brings them in contact with two of the teats; this presses said teats into seats 21; these upper fingers serve as cut-offs to prevent the milk passing back into the udder; these two fingers remain closed until fingers 10, 13 and 11, 14 are closed and the milk passes from the teats into a receptacle which may be conveniently arranged to receive the same; the cams then rotate to engage the fingers at the opposite side of center-plate 2, and repeat the above described operations an indefinite number of times in the same sequence until all of the milk is drawn from the cow.

A single one of these devices may be used for the purpose of milking one cow, or a battery of them may be connected to, and driven by a common shaft and attached to a plurality of cows for the purpose of milking all of them simultaneously.

My invention may be constructed of any material and made any size deemed suitable for all the requirements of such an apparatus, and while I have illustrated and described a preferred form of mechanism and combinations of elements considered essential in materializing the same, I wish to include in this application all mechanical equivalents and substitutes that may be fairly considered to come within the scope and purview of my invention as defined in the appended claims.

Having thus described my invention so that others skilled in the art to which it appertains may be enabled to construct and use the same, what I claim and desire to secure by Letters Patent, is:—

1. The herein described milking apparatus, consisting of supporting means for cam-actuated reciprocating fingers, cams to open said fingers, means to operate said cams, teat seats fixed to said supporting means, springs to press said fingers toward said seats for the purpose of engaging the teats, pressure-pads to register with the udder hinged to said supporting means, means to hold the pressure-pads in normal engagement with said udder, and means to fasten the complete apparatus to the body of a cow, substantially as set forth.

2. The herein described apparatus consisting of a center-plate, teat seats attached to said center-plate, supporting means for side-plates carried by said center-plate, said side-plates carrying arms, bearings attached to said arms, reciprocating fingers pivoted to said bearings, tips adjacent the ends of said fingers, cams pivotally mounted in said center-plate and said side-plate supporting means, said cams being adapted to open said fingers, springs passing from the side-plates to said fingers for the purpose of closing same and causing the tips to press the teats into said teat seats, pressure-pads to register with the udder hinged to said center-plate, means to hold said pressure-pads in normal engagement with the udder, means to regulate the tension of said springs, means to drive the cams, and means to fasten the complete apparatus to the body of a cow, substantially as set forth.

3. In a cow-milking apparatus, a center-plate, a bottom-plate attached to said center-plate, side-plates pivoted to said bottom-plate, arms projecting from said side-plates, bearings attached to said arms, fingers arranged in pairs pivoted to said bearings, teat seats passing transversely of said center-plate, pressure-pads to register with the udder hinged to said center-plate, means to hold said pressure-pads in normal engagement with the udder, cams fixed to a cam-shaft, said cam-shaft being rotatably mounted in the center-plate and bottom-plate, the highest points of said cams being arranged in echelon in such order that the highest point of each cam is a component part of ninety degrees past the cam above it and the highest point of the bottom cam ninety degrees past the top cam, springs to close said fingers, gears to drive said cams, means to lock and release said hinged parts, and means to attach the complete apparatus to the body of a cow, substantially as set forth.

4. In a device of the character described, a center-plate, a bottom-plate fixed to said center-plate, side-plates hinged to said bottom-plate, arms projecting from said side-plates, bearings attached to said arms, overlapping fingers arranged in pairs and adapted to co-act simultaneously pivoted to said bearings, tips attached to said fingers, teat seats passing transversely of the center plate, pressure-pads to register with the udder hinged to said center-plate, means to hold said pressure-pads in normal engagement with the udder, cams fixed to a cam-shaft, said cam-shaft being rotatably mounted in the center-plate and bottom-plate, the highest points of said cams being arranged in echelon in such order that the highest point of each cam is a component part of ninety degrees past the cam above it and the highest point of the bottom cam ninety degrees past the top cam, springs passing from the side-plates to the fingers, said springs being adapted to close said fingers and cause the tips to press the teats into said seats, means to drive said cams, means to lock and release said hinged parts, and means to attach the complete apparatus to the body of a cow, substantially as set forth.

5. In a device of the character described, a center-plate, a bottom-plate attached to said center-plate, side-plates hinged to said bottom-plate, arms fastened to said side-plates, bearings fixed to said arms, overlapping fingers arranged in pairs and adapted to co-act simultaneously pivoted to said bearings intermediate said arms, tips composed of tenacious material attached adjacent the ends of said fingers, teat seats passing transversely of the center-plate, pressure-pads to register with the udder hinged transversely of the upper portion of the center-plate, leaf springs attached to said center-plate and said pressure-pads to hold said pressure-pads in normal engagement with the udder, cams fixed to a cam-shaft, said cam-shaft being rotatably mounted in the center-plate and bottom-plate, the highest points of said cams being arranged in echelon in such order that the highest point of each cam is a component part of ninety degrees past the cam above it and the highest point of the bottom cam ninety degrees past the top cam, springs attached to said side-plates and said fingers, each spring being adapted to close one pair of fingers and cause the tips to press the teats into the seats, means to drive said cams, latches to lock and release said hinged parts, and means to attach the complete apparatus to the body of a cow, substantially as set forth.

In testimony that I claim the foregoing as my own, I hereunto affix my signature in the presence of two subscribing witnesses.

GEORGE A. BRODIE.

Witnesses:
PETER HABERLIN,
ISAAC SWETT.

Copies of this patent may be obtained for five cents each, by addressing the "Commissioner of Patents, Washington, D. C."